United States Patent [19]

Martin

[11] 4,380,268

[45] Apr. 19, 1983

[54] PETROLEUM AND GAS WELL ENHANCEMENT AGENT

[75] Inventor: Keith R. Martin, West Chester, Pa.

[73] Assignee: Uniflo Resources, Inc., Springfield, N.J.

[21] Appl. No.: 281,718

[22] Filed: Jul. 9, 1981

[51] Int. Cl.³ .................... E21B 37/06; E21B 43/00
[52] U.S. Cl. ............................ 166/304; 134/22.14; 134/22.19; 134/40; 252/8.55 B; 252/40; 252/170; 252/173; 252/174.21; 252/174.22
[58] Field of Search .............. 134/22.14, 22.19, 40; 252/170, 174.21, 174.22, 173, 8.55 B; 166/304

[56] References Cited

U.S. PATENT DOCUMENTS

| | | | |
|---|---|---|---|
| 2,952,571 | 9/1960 | Freedman | 134/22.19 |
| 3,536,529 | 10/1970 | Fiocco | 252/170 |
| 4,259,199 | 3/1981 | Wee et al. | 252/174.21 |
| 4,276,326 | 6/1981 | Joshi | 252/174.21 |

FOREIGN PATENT DOCUMENTS 2448532  4/1975  Fed. Rep. of Germany .

*Primary Examiner*—Shrive P. Beck

[57] ABSTRACT

Recovery of gas and oil is enhanced by the removal of paraffin and other hydrocarbons from wells by flushing the wells with water containing a polymer of a primary alcohol and ethylene oxide plus sodium silicate.

2 Claims, No Drawings

PETROLEUM AND GAS WELL ENHANCEMENT AGENT

TECHNICAL FIELD

The invention relates to the area of industrial cleaning, petroleum well stimulation, enhanced oil recovery, secondary and tertiary enhanced oil recovery methods. More particularly the invention relates to a solvent used for cleaning, parafin removal from stripper wells, water removal from gas wells and field flooding of underground oil deposits.

BACKGROUND OF THE INVENTION

There are many solvents on the market that are toxic and highly flammable which severely limits their use. Furthermore, these solvents are frequently petroleum-based and therefore make the users dependent on the fluctuation of an unsteady oil market.

Because of these limitations it was recognized that there was a need for an industrial solvent that is non-toxic, biodegradable, non-flammable, and which should not contain petroleum, phosphates, butyl or any heavy metals.

The present invention attempts to meet such a need by providing such a solvent and by providing for a process of petroleum and gas well stimulation.

SUMMARY OF THE INVENTION

The foregoing and other problems are solved herein by a detergent degreaser comprising a polymer of a primary alcohol and ethylene oxide. In addition a process is disclosed for petroleum and gas well stimulation and removal of parafin in a well comprising the steps of (a) adding to a well the polymer of a primary alcohol and ethylene oxide, (b) adding water, (c) pump the solution so formed up the tubing of the gas or oil well, (d) discontinuing pumping of the well for 24 to 48 hours, (e) repumping the well.

DETAILED DESCRIPTION

Detergent Degreaser

Detergent cleaning of oil and gas wells has been optimized by the development of a new detergent degreaser. The detergent degreaser comprises a polymer of a straight chain linear carbon that is ethoxylated with ethylene oxide. Preferably a ten or eleven carbon linear alcohol is reacted with 6 mols of ethylene oxide and then reacted with a ten carbon linear alcohol to form an active detergent degreaser. In addition, for maximum performance sodium silicate anhydrous is added.

It should be understood that linear alcohols ranging in carbon numbers from 7 to 40 can be used as well as alcohols comprising from 3 to 10 ethylene oxide molecules.

Other silicates can be used with the formulation, however, the performance has been found to be impaired.

The detergent degreaser is diluted in the preferred embodiment of the invention with water. However, any suitable solvent such as a glycol-ether, glycol, or alcohols would be suitable for this detergent degreaser. It is important that the ratio of ethoxylated alcohol to silicate be approximately 5 to 1. Hence, a product at various active concentrations up to 30% to 35% can be utilized. At 30% to 35% there is some separation due to limited water solubility.

Oil and Gas Well Stimulation

A recognized problem in oil and gas wells has been the accumulation of parafin deposits in the tubing necessary for adequate functioning of the wells. It has been found that the parafin which is a solid hydrocarbon of oil that forms on the sides of the tubing as the temperature of the oil changes on its way to the surface, can be broken loose from the sides of the tubing thereby coming to the surface by applying the detergent degreaser described above. The detergent degreaser is poured down the anulus of the well where it soaks into the pourous parafin deposits and breaks them loose. This opens up the tubing and allows more oil to be drawn to the surface. Furthermore, it has been found that wellbore cleanout prior to stimulation is facilitated by the addition of the detergent degreaser. Oil and gas well yields have been found to have increased by at least 500% by the addition of the detergent degreaser described above. Also, this same detergent degreaser is used for the removal of water in gas wells with the same percentage of increase realized.

Another unique function of the detergent degreaser has been in the area of chemical field flooding which results in enhanced oil recovery. Enhanced or "tertiary" oil recovery consists of a technique called chemical flooding. It has been found that if the detergent degreaser is pumped into small wells surrounding a main production well, the detergent degreaser acts to wash out the oil from the tight pores and fissures where it is trapped. When the area is subsequently pumped with water it is found that the pressure in the reservoir is increased and along with the oil's reaction to the detergent degreaser the oil is liberated and pushed towards the main production well. This method would then increase the oil yield from the main production well.

It should be understood that many uses for the detergent degreaser disclosed within would be obvious to a person skilled in the art. The uses formulated herein are just examples and are not meant to limit the uses of the detergent degreaser.

EXAMPLE 1

Water is heated to 130° F. (88% final weight) and mixed with sodium silicate anhydrous (2% final weight) and a polymer of a 10 linear carbon alcohol and an 11 linear carbon alcohol that is ethoxylated with 6 mols (weight) of ethylene oxide.

EXAMPLE 2

25 gallons of a detergent degreaser comprised of 88% water, 2% sodium silicate anhydrous and 10% of a polymer of a 10 straight chain linear carbon alcohol and an 11 straight chain linear carbon alcohol that is ethoxylated with 6 mols (weight) of ethylene oxide is poured down the anulus of a gas or oil well followed by pouring 100 to 150 gallons of water down the same anulus. Thereafter, the entire solution is pumped up the tubing of the well and the well is shut down for 24 to 48 hours. Subsequently, the well is repumped thereby resulting in the removal of the parafin deposits from the oil or gas well.

What is claimed is:

1. A process for removal of paraffin from gas and petroleum wells comprising the steps of:
   (a) adding to a well a mixture of 10 weight percent polymer of a primary alcohol and ethylene oxide, 2 weight percent sodium silicate and 88 weight percent water;
(b) adding water to the well;
(c) pumping the mixture up the well;
(d) discontinuing pumping of the well; and
(e) repumping the well.

2. A petroleum and gas well enhancing agent comprising:
(a) 10 weight percent of a polymer of a primary alcohol and ethylene oxide;
(b) 2 weight percent of sodium silicate; and
(c) 88 weight percent of water.

* * * * *